(12) United States Patent
Aigner et al.

(10) Patent No.: US 6,193,272 B1
(45) Date of Patent: Feb. 27, 2001

(54) KNEE PROTECTOR WITH LOAD DISTRIBUTION CAGE

(75) Inventors: Joachim Aigner, Landshut; Werner Balser, Hamburg, both of (DE)

(73) Assignee: Autoliv Development AB (SE)

( * ) Notice: Subject to any disclaimer, the term of this patent is extended or adjusted under 35 U.S.C. 154(b) by 0 days.

(21) Appl. No.: 09/468,481

(22) Filed: Dec. 17, 1999

(30) Foreign Application Priority Data

Dec. 18, 1998 (DE) .............................................. 198 58 520

(51) Int. Cl.⁷ ...................................................... B60R 21/22
(52) U.S. Cl. ........................................ 280/730.1; 280/753
(58) Field of Search .......................... 280/730.1, 730.2, 280/753, 728.2, 728.1

(56) References Cited

U.S. PATENT DOCUMENTS

| | | | | |
|---|---|---|---|---|
| 5,209,519 | * | 5/1993 | Shiga et al. ........................ | 280/728.2 |
| 5,382,051 | * | 1/1995 | Glance ............................... | 280/730.2 |
| 5,458,366 | * | 10/1995 | Hock et al. ........................ | 280/730.1 |
| 5,536,043 | * | 7/1996 | Lang et al. ......................... | 280/753 |
| 5,931,493 | * | 8/1999 | Sutherland ......................... | 280/730.1 |
| 6,039,380 | * | 3/2000 | Heilig et al. ........................ | 280/753 |

FOREIGN PATENT DOCUMENTS

| | | | |
|---|---|---|---|
| 0 684 164 | * | 11/1995 | (EP) . |
| 0 820 905 | * | 1/1998 | (EP) . |
| 97/09207 | * | 3/1997 | (WO) . |

* cited by examiner

*Primary Examiner*—Lanna Mai
*Assistant Examiner*—Lynda Jasmin
(74) *Attorney, Agent, or Firm*—Robert W. Becker & Associates

(57) ABSTRACT

A knee protector for vehicle passengers has a securing member for securing the knee protector within the vehicle. An inflatable air bag is mounted in an initially folded position on the securing member. A deformable cage is connected to the securing member and encloses the air bag in the initially folded state and in the deployed state as well as in all intermediate states. A cover is connected to a side of the cage opposite the securing member and attached to the securing member when the air bag is in the initially folded position. The cover is designed to detach from the securing member and to perform a movement away from the securing member upon deployment of the air bag in order to provide a load distribution plate for knee protection. The deformable cage guides the cover during the movement away from the securing member upon deployment of the air bag and during a return movement toward the securing member.

9 Claims, 4 Drawing Sheets

KNEE PROTECTOR WITH LOAD DISTRIBUTION CAGE

BACKGROUND OF THE INVENTION

The invention relates to a knee protector for vehicle passengers comprising an air bag arranged in the foot area, respectively, in the lower region of the dashboard of a vehicle behind a cover plate, wherein the air bag, upon deployment and inflation, will act on the cover plate so that it becomes detached from the securing means and is moved as a load distribution plate in the direction toward the knees of the passenger.

A knee protector with the aforementioned features is known from European Patent Document 0 684 164 A1. This knee protector device a the cover plate which is integrated in the foot area of the vehicle at the dashboard, and behind the cover plate the air bag is arranged which is deployed in the case of an accident. When deployed, the air bag will inflate and will cause the cover plate to become separated because of the inflation pressure so that the cover plate is moved in the direction toward the knee of the passenger. This cover plate upon contact at the knees will act as a load distribution plate. The subsequent energy absorption of the knee protector is achieved, similar to the action of air bag devices acting on the torso of a passenger, in that the pressure acting on the load distribution plate and thus on the air bag will cause gas to be released from the air bag via openings provided in the device or because of the permeability of the fabric of the air bag. For limiting the displacement movement of the load distribution plate in the direction toward the knee of the passenger, the load distribution plate of the known knee protector device is connected by a cable portion to the securing device.

The known knee protector has the disadvantage that the movement of the load distribution plate depends on the inflation behavior of the air bag loading it, so that a non-directed (random) displacement of the load distribution plate cannot be prevented. There is, for example, the risk that the load distribution plate will impact the knee of the passenger with an edge instead of the plate surface. Moreover, movement of the passenger and the resulting pressure during the energy absorption phase of the air bag supporting the load distribution plate can result in lateral displacement causing non-uniform energy absorption.

Another knee protector device is known from Patent Document WO 97/09207 in which the load distribution plate is fixedly connected to the air bag or is a component of the air bag fabric. This also has the aforementioned disadvantage with respect to the inflation behavior or the behavior during energy absorption.

In European Patent Document 0 820 905 A1 a knee protector is disclosed in which the inflating air bag will cause a deformable portion of the dashboard to bulge outwardly in the direction toward the knees of the passenger whereby the air bag will not penetrate the respective portion in the dashboard. With such a device it is possible to realize only limited deformation strokes.

SUMMARY OF THE INVENTION

It is therefore an object of the present invention to improve the energy absorption for a knee protector of the aforementioned kind having a movably arranged load distribution plate that can be released from the dashboard.

This is inventively solved in that the knee protector has a securing member for securing the knee protector in a vehicle and an inflatable air bag mounted in the initially folded position on the securing member. A deformable cage is connected to the securing member and encloses the air bag in the initially folded state, in the deployed state and all intermediate states of inflation/deflation. A cover connected to a side of the cage opposite the securing member is provided and attached to the securing member when the air bag is in the initially folded position. The cover is configured to detach from the securing member and to perform a movement away from the securing member upon deployment of the air bag in order to provide the load distribution plate for knee protection. The deformable cage is configured to guide the cover during the movement away from the securing member upon deployment of the air bag and during a return movement toward the securing member.

The basic idea of the present invention is that the load distribution plate is connected by a cage to the securing member. The cage is comprised of a deformable material and provides a guiding action for the load distribution plate upon its displacement resulting from the inflation of the air bag as well as during its return movement. The cage completely encloses the air bag in all movement (inflation/deflation) states. The invention has the advantage that the displacement of the load distribution plate during inflation of the air bag results in a defined guiding action in the direction toward the knees of the passenger so that a knee injury of the passenger can be substantially prevented. Advantageously, during the impact of the passenger onto the load distribution plate a defined guided deformation of the cage being in its stretched position is ensured which, in addition to the energy absorption by the air bag, provides an additional component of energy absorption. Since the cage completely encloses the air bag in all movement states and the cage cannot carry out evasive movements during loading of the load distribution plate, it is ensured that the surface of the load distribution plate is identical to the contact surface between the inflated air bag and the inner side of the load distribution plate so that a correspondingly high energy absorption coefficient is provided.

According to one embodiment it is suggested that the cage comprises a structure having stretching as well as compression zones so that the envisioned tasks of the cage during displacement of the load distribution plate in the direction toward the knees of the passenger as well as the subsequent return movement during energy absorption can be realized.

For this purpose, the cage may be provided with corner regions for connecting the cage to the securing member, embodied as a securing plate, and to the load distribution plate, wherein the corner regions have stays that are provided with regions of reduced material strength. According to one embodiment of the invention, lateral surfaces extend between the corner regions or stays. These lateral surfaces (sidewalls) are provided with flexible (stretchable and compressible) structures designed as a diamond-shaped grid.

In order to prevent injuries of the passengers caused by the knee protector, it may be suggested that the connecting regions of the load distribution plate to the cage are rounded.

Inasmuch as the knee protector is a separate element provided in the foot area of the vehicle or mounted within the dashboard, at least partially integrated therein, it is suggested that the cage has an outer side which for visual appearance reasons is provided with a cover having a circumferential rated break point. Accordingly, a cushioning of the load distribution plate and the adjacent areas is provided so that this also reduces the risk of injury. The provided rated break point allows the detachment of the load distribution plate from the remainder of the cover connected to the securing member and its movement relative to the securing member. The cage of the present invention may be made of metal or a suitable composite material.

In another embodiment, the cage and the load distribution plate are connected to one another so as to form a monolithic part whereby the load distribution plate as a monolithic component of the cage is then provided with a cover at its outer side facing the passenger.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 5.

Figure 1:
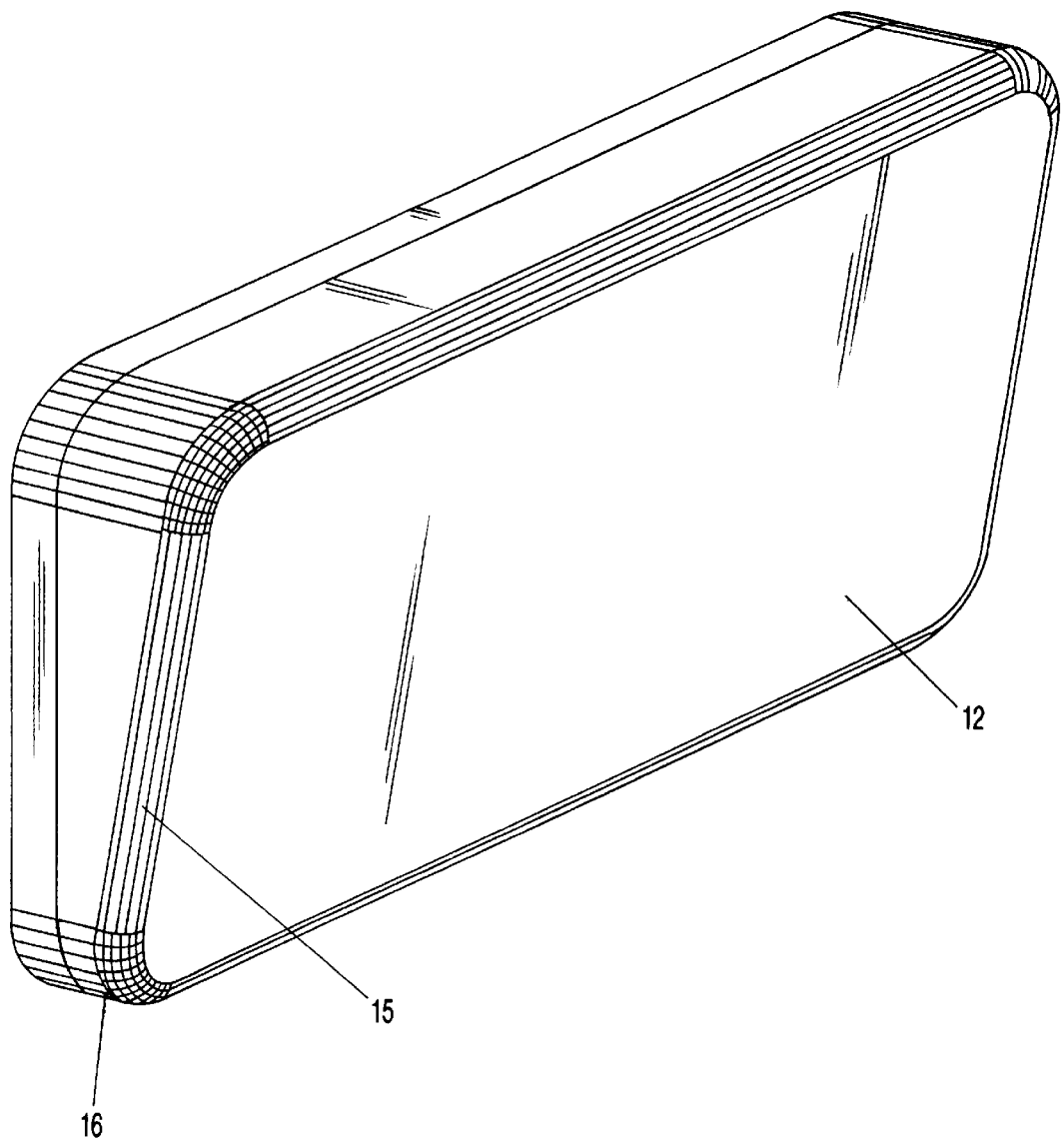
FIG. 1 is a knee protector in the initial position.

The knee protector 10 represented in FIG. 1 in its entirety is comprised of a securing member which in the shown embodiment is a securing plate 11. The securing plate 11 can be mounted in the foot area or the lower end of the dashboard of a vehicle at a vehicle structure or can be integrated into the dashboard. The cover 20 with load distribution plate 12 is secured at the securing plate 11 which can be moved in the direction toward the knees of the passenger. The securing plate 11 and the cover 20 with load distribution plate 12 form a housing by being provided with correlated outer sidewalls 14. The load distribution plate 12 and the connected sidewalls 14 have rounded connecting regions (at 15) in order to reduce the risk of injury by the knee protector 10. Accordingly, the corners 16 between the adjacently positioned sidewalls 14 are also rounded.

Figure 2:
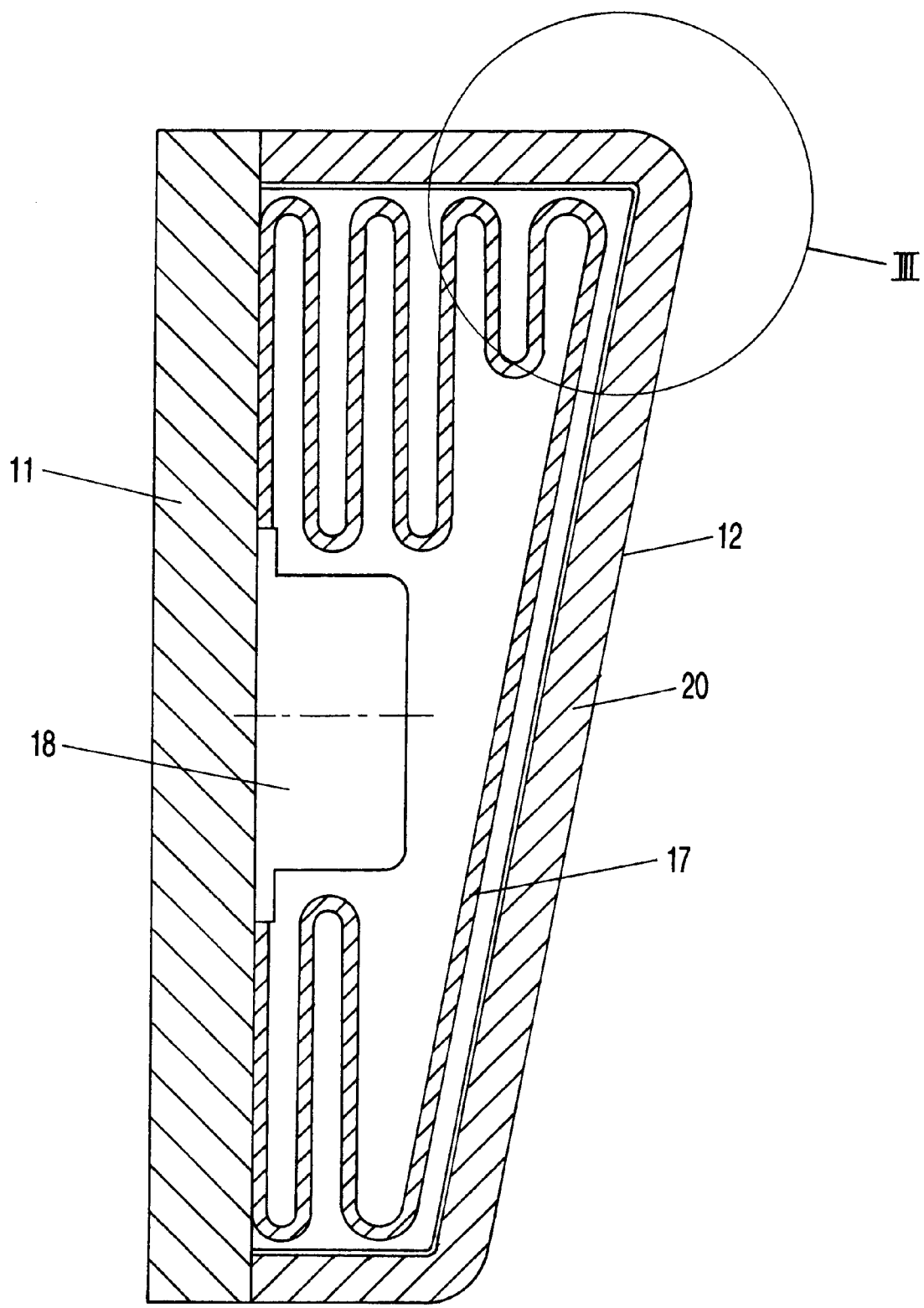
FIG. 2 shows the knee protector of FIG. 1 in a sectioned side view.
Figure 3:
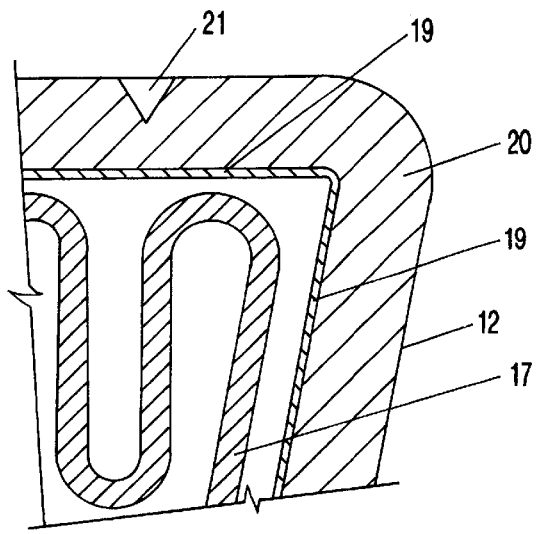
FIG. 3 shows a detail III of FIG. 2 in an enlarged representation.

As can be seen in detail in FIG. 2, a gas generator 18 is mounted to the securing plate 11. It extends into the air bag 17 folded into the interior of the housing defined by the securing plate 11 and the cover 20 comprised of the load distribution plate 12 and sidewalls 14. At the inner sides of the sidewalls 14 and of the load distribution plate 12 a cage 19 made of metal or a composite material or any other suitable material is located, i.e., the cage 19 is outwardly enclosed by the cover 20 in the initial position. As can be seen in FIG. 3, the outer cover 20 is provided with a circumferential rated break point 21 in order to allow separation of the load distribution plate 12 from the securing plate 11.

Figure 4:
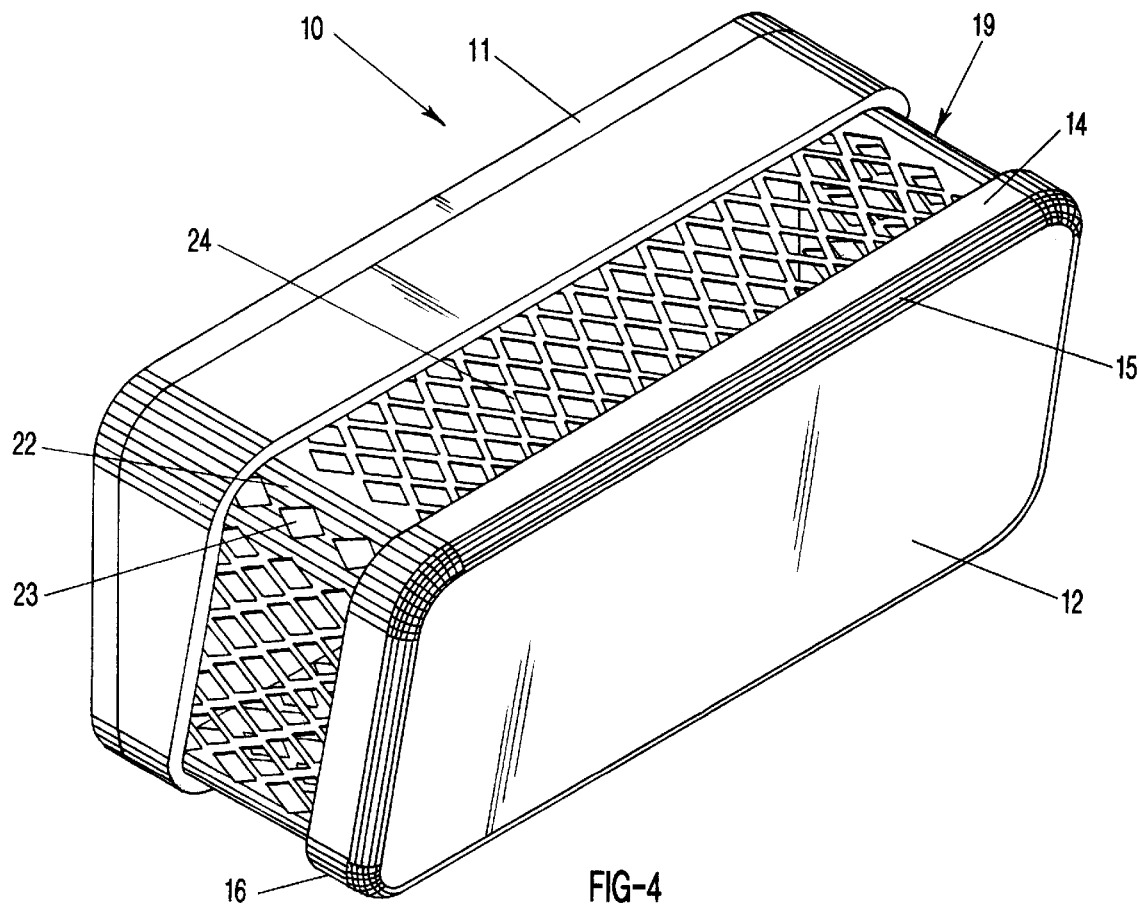
FIG. 4 shows the knee protector of FIG. 1 after displacement in the direction toward the knees of the passenger but before of the energy absorption phase.
Figure 5:
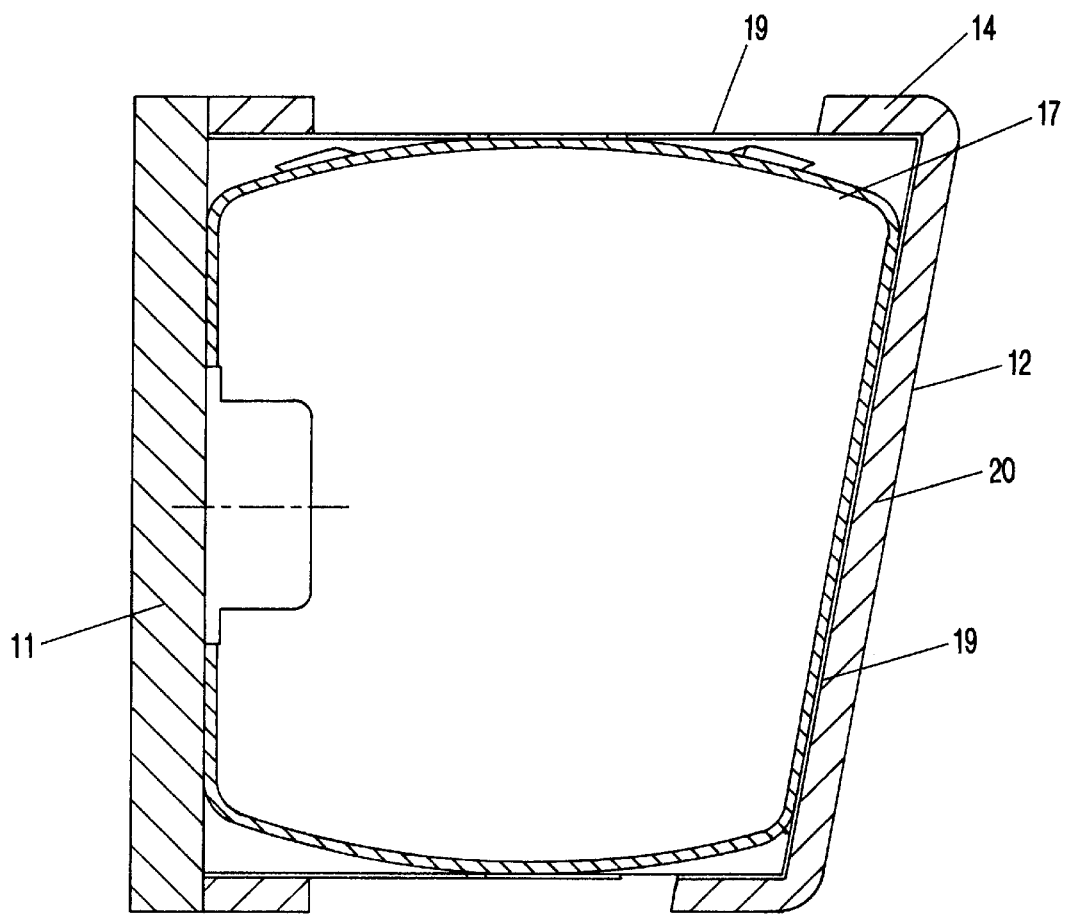
FIG. 5 shows the knee protector of FIG. 4 in a sectioned side view.

FIG. 4 shows the design and function of the cage 19 in more detail. The cage 19 has stays 22 in the respective corner regions which stays are provided with regions 23 of reduced material strength in the form of diamond-shaped openings. The sidewalls of the cage 19 are provided with diamond-shaped grid structures 24 providing reduced material strength. These areas of reduced material strength allow, on the one hand, a stretching of the cage 19 upon inflation of the air bag 17 from the position shown in FIG. 1 into the position shown in FIG. 4, and they allow at the same time a return movement of the load distribution plate 12 upon energy absorption in the direction toward the securing plate 11 during the energy absorption phase.

The compression deformation or the stretching deformation of the cage will not result in pointed or sharp edges or tips projecting from the cage. The cage 19 embodied as disclosed, i.e., enclosing the air bag 17 in all movement states, ensures that a defined guided deformation of the knee protector 10 is realized without the air bag 17 performing any evasive movements during inflation or during energy absorption and the thus caused partial emptying.

The specification incorporates by reference the disclosure of German priority document 198 58 520.9 of Dec. 18, 1998.

The present invention is, of course, in no way restricted to the specific disclosure of the specification and drawings, but also encompasses any modifications within the scope of the appended claims.

What is claimed is:

1. A knee protector (10) for a vehicle passenger, said knee protector comprising:

a securing member (11) for securing said knee protector (10) in a vehicle;

an inflatable airbag (17) mounted in an initially folded position on said securing member (11);

a deformable cage (19) connected to said securing member (11) and enclosing said airbag (17) in said initially folded state, a deployed state, and all intermediate states of inflation or deflation;

a cover (20) connected to a side of said cage (19) opposite said securing member (11) and attached to said securing member (11) when said airbag (17) is in said initially folded position;

said cover (20) configured to detach from said securing member (11) and to perform a movement away from said securing member (11) upon deployment of said airbag (17) in order to provide a load distribution plate (12) for knee protection;

said deformable cage (19) configured to guide said cover (20) during said movement away from said securing member (11) upon deployment of said airbag (17) and during a return movement toward said securing member (11).

2. A knee protector according to claim 1, wherein said cage (19) has a flexible structure configured to allow stretching and compressing of said cage (19) in a direction of said movement of said cover (12).

3. A knee protector according to claim 2, wherein said cage (19) has corner regions comprised of stays (22) configured to connect said cage (19) to said securing member (11) and said cover (20), wherein said securing member (11) is a securing plate and wherein said stays (22) have regions of reduced material strength (23).

4. A knee protector according to claim 3, wherein said cage (19) has lateral surfaces extending between said corner regions and wherein said lateral surfaces are provided with said flexible structure, said flexible structure designed as a diamond-shaped grid (24).

5. A knee protector according to claim 1, wherein said cover (20) has connecting regions (15) for connecting said cover (20) to said cage (19), wherein said connecting regions (15) are rounded.

6. A knee protector according to claim 1, wherein said cover (12) has a circumferentially extending rated break point (21).

7. A knee protector according to claim 1, wherein said cage (19) is made of metal.

8. A knee protector according to claim 1, wherein said cage (19) is made of a composite material.

9. A knee protector according to claim 1, wherein said cage (19) and said load distribution plate (12) form a monolithic part.

* * * * *